(12) United States Patent
Sherriff et al.

(10) Patent No.: US 6,647,315 B1
(45) Date of Patent: Nov. 11, 2003

(54) USE OF REMOTE SOFT PHASES IN A PROCESS CONTROL SYSTEM

(75) Inventors: Godfrey R. Sherriff, Austin, TX (US); William G. Irwin, Austin, TX (US); David L. Deitz, Austin, TX (US); Grant Wilson, Austin, TX (US)

(73) Assignee: Fisher-Rosemount Systems, Inc., Austin, TX (US)

(*) Notice: Subject to any disclaimer, the term of this patent is extended or adjusted under 35 U.S.C. 154(b) by 370 days.

(21) Appl. No.: 09/677,552

(22) Filed: Sep. 29, 2000

(51) Int. Cl.[7] .............................................. G06F 19/00
(52) U.S. Cl. ........................................ 700/204; 700/266
(58) Field of Search .................. 700/100, 98, 107–109, 700/167, 204, 266; 707/203, 101, 104

(56) References Cited

U.S. PATENT DOCUMENTS

| | | | | |
|---|---|---|---|---|
| 5,450,346 A | * | 9/1995 | Krummen et al. | 700/11 |
| 5,668,993 A | * | 9/1997 | Peters et al. | 709/101 |
| 6,411,987 B1 | * | 6/2002 | Steger et al. | 709/203 |
| 6,449,624 B1 | * | 9/2002 | Hammack et al. | 707/203 |
| 6,505,247 B1 | * | 1/2003 | Steger et al. | 709/224 |

FOREIGN PATENT DOCUMENTS

| | | |
|---|---|---|
| GB | 2 341 240 A | 10/2000 |
| GB | 2 351 815 A | 10/2001 |

OTHER PUBLICATIONS

Search Report under Section 17(5) issued by the United Kingdom Patent Office on Mar. 12, 2002.

* cited by examiner

*Primary Examiner*—Leo Picard
*Assistant Examiner*—Kidest Bahta
(74) *Attorney, Agent, or Firm*—Marshall, Gerstein & Borun LLP (57) ABSTRACT

A process control system includes an executive routine located at a first node of a process control system, one or more soft phases located at other nodes remote from the first node and communication software located in the each of the nodes to enable the executive routine to call and execute the soft phases that are at nodes remote from the first node. This operation may reduce loading or communication traffic on the batch executive node and enables the operator to interact with a soft phase at a workstation or node that is convenient to the operation of the soft phase, which makes the operator's task easier and results in faster execution of the soft phase.

25 Claims, 3 Drawing Sheets

USE OF REMOTE SOFT PHASES IN A PROCESS CONTROL SYSTEM

FIELD OF THE INVENTION

The present invention relates generally to process control networks and, more particularly, to initiating soft phases in processes, such as in batch processes.

DESCRIPTION OF THE RELATED ART

Process control networks, such as those used in chemical, petroleum or other processes, generally include one or more process controllers communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 ma (milliamp) signals to and from the field devices. More recently, however, the process control industry has developed a number of standard, open, digital or combined digital and analog communication protocols such as the FOUNDATION™ FIELDBUS (hereinafter "Fieldbus"), HART®, PROFIBUS®, WORLDFIP®, Device-Net® and CAN protocols which can be used to implement communications between a controller and field devices. Generally speaking, the process controller receives signals indicative of measurements made by one or more field devices and/or other information pertaining to the field devices, uses this information to implement a typically complex control routine and generates control signals that are sent via the signal lines or buses to the field devices to thereby control the operation of the process.

Certain types of process control networks, such as those used in batch processes, typically include multiple sets of replicated equipment designed to have the same or similar equipment which performs essentially the same function within the processes. Thus, for example, a cookie manufacturing plant may have multiple sets of mixing equipment, multiple sets of baking equipment, and multiple sets of packaging equipment, with some or all of the individual mixers being capable of operating in parallel and of being connected to operate in series with some or all of the baking equipment and the packaging equipment. Typically, in a batch process, a batch executive is stored in a workstation communicatively coupled to one or more process controllers and the batch executive initiates a number of different steps or stages in sequence, finishing the first stage before beginning the second stage to perform a batch run. Thus, in the cookie manufacturing plant described above, the batch executive runs a first sub-process or step to control the mixing equipment, then runs a second sub-process to run the baking equipment on the product made by the mixing equipment and then runs a third sub-process that controls the packaging equipment to package the product produced by the baking equipment. The different steps in these sub-processes are typically referred to as phases.

Generally speaking, a master program, called a batch executive is located at a central or other convenient node within the process control environment having numerous user workstations and controllers located at different nodes. The batch executive schedules and initiates the different phases making up a certain batch process control scheme. In particular, the batch executive is created to call the different phases of a batch process in sequence, assuring that the first phase is completed before initiating the second phase and so on. The actual phases initiated by the batch executive are stored on and executed by one or more controllers (which are at different nodes within the process control environment) and the controller that runs a particular phase reports completion of the phase to the batch executive after the phase has run. Likewise, if the execution of the phase fails or if some other problem in the phase arises, the controller informs the batch executive, which may inform the operator of the problem or may provide the controller with instructions to alleviate or ignore the problem. In some instances, the phases within the controller may also ask the batch executive for information needed to run the phase and/or may provide the batch executive with data pertinent to the operation of the phase.

Generally, in many batch processes as well as other processes, the process control system needs to interact with other systems that are external to the process control system. Examples of such external systems include, but are not limited to, a raw materials database that stores information about the quantity of raw materials on hand, batches that those materials have been allocated to, etc., a laboratory information management system that provides lab analysis information (such as composition, concentration, purity, etc.) based on a sample that has been drawn from the batch, information input systems such as radio frequency barcode readers that might be used to scan process equipment identification tags, product storage container tags, raw material identification codes, etc., and manual (i.e., operator) initiated actions. In general, these external systems are running on workstations rather than on controllers.

To enable interaction with these external systems or actions, the batch executive runs or calls what are commonly referred to as soft phases. Generally speaking, a soft phase is a user supplied, PC based routine (written in, for example, Visual Basic or Visual C++) that is executed on a workstation or other user interface instead of a controller to interact with external systems or to enable manually initiated actions, such as those mentioned above. For example, the main function of a soft phase may be to communicate with a user, operator, maintenance person, etc. in a manner that is necessary for operation of a batch process. Soft phases may be used to interact with an operator or other plant personnel to assure that certain activities, such as manual activities necessary for the batch process, take place. Here, the soft phase may instruct an operator to take a particular step and ask the operator to inform the soft phase when the action is complete. The soft phase may then tell the operator the next step to perform and wait for acknowledgment that the instruction has been performed. These common types of soft phases are used to cause the operator to load or configure certain equipment used in other phases of the batch process, to take and test a sample to assure that the batch process is performing correctly, etc. Of course, soft phases may be used for other purposes.

In the past, batch executive routines were limited to calling or executing soft phases that were stored in the same workstation or computer (i.e., node) as the batch executive. Here, the batch executive instructed a server within the workstation executing the batch executive to call and implement a soft phase on that same workstation. The soft phase server would find and launch the soft phase and report back to the batch executive when the soft phase had completed execution. The soft phase could also communicate with the batch executive through the soft phase server to get information from the batch executive, if necessary.

Typically, the batch executive was run on a master workstation which was in a central or secure location within a plant. As a result, when implementing a soft phase, which typically requires some sort of user action and input during operation of the phase, the user had to be at the master workstation, which typically meant that the user was away from the plant equipment that needed to be manipulated during the soft phase. This was inconvenient for the user and caused the soft phase to execute very slowly because the operator or user had to go out into the plant after each step of the soft phase and return to acknowledge completion of that step. In other words, because the soft phase had to be executed on the same workstation as the batch executive, the soft phase was generally executed on a workstation that was inconvenient for the user interacting with the soft phase. Also, soft phases which run on the same workstation as the batch executive contend with the batch executive for processing resources, which may slow the batch executive down and may lead to loading problems on the CPU. Still further, some soft phases need to use other resources such as a database to perform the desired functions. However, this means that a lot of network traffic may be generated between the node on which the batch executive resides and a database server node, which is undesirable.

SUMMARY OF THE INVENTION

A process control system includes soft phases which can be implemented on nodes or computers that are remote or separated from the node on which a batch executive calling those soft phases is executing. This system enables the operator to interact with a soft phase at a workstation or node that is most convenient to the operation of the soft phase, which makes the operator's task easier and may result in faster execution of the soft phase. This system also reduces CPU or network loading on the batch executive node and may reduce network traffic to and from the batch executive node by allowing soft phases, which may be resource or communication intensive, to be located on other nodes.

According to one aspect of the present invention, a process control system includes a first computing device located at a first node within the process control system, a second computing device located at a second node within the process control system and a communication link between the first and second nodes providing communications between the first node and the second node. An executive routine which may be, for example, a batch executive routine, is stored on and is adapted to be executed by the first computing device, a soft phase is stored on and is adapted to be executed by the second computing device and remote communication software is stored on and adapted to be executed by the first and second computing devices to enable the executive routine to call the soft phase for execution via the communication link.

The remote communication software may include a server stored in and adapted to be executed on the first computing device and a soft phase broker stored in and adapted to be executed on the second computing device, wherein the server and the broker include communication software or communication layers adapted to communicate via the communication link. If desired, the broker may include a program launcher for locating and executing the soft phase on the second computing device and may be adapted to inform the server when the soft phase has completed execution on the second computing device. The broker may also coordinate communications between the soft phase and the batch executive. Also, the executive routine may inform the server of the location of the soft phase when calling the soft phase or the location of the soft phase may be ascertained from a configuration database associated with the process control system.

DESCRIPTION OF THE PREFERRED EMBODIMENTS

Figure 1:
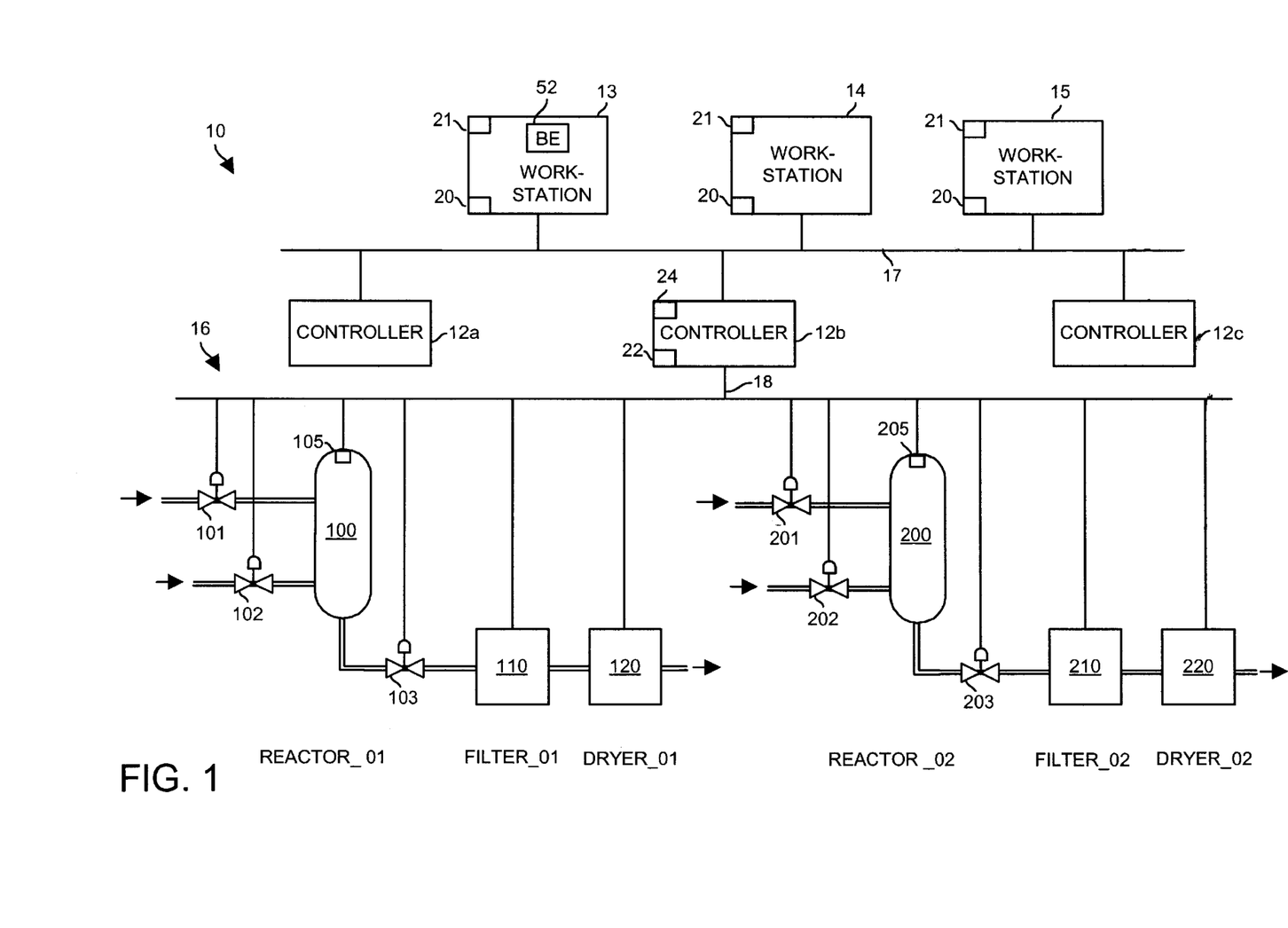
FIG. 1 is a partial block diagram, partial schematic diagram of a portion of a process control network that uses a batch executive to call one or more soft phases at remote nodes.

Referring now to FIG. 1, a process control network 10 includes one or more process controllers 12a–12c coupled to various computers or workstations 13, 14 and 15 via, for example, an Ethernet communication connection 17. Of course the communication connection 17 can be any type of communication link including a bus, a set of wires, a wireless connection, etc. One of the controllers 12b is illustrated in FIG. 1 as being coupled to devices or equipment within a process (generally designated by the reference numeral 16) via an input/output (I/O) device (not shown) and a set of communication lines or a bus 18. The other controllers 12a and 12c may be similarly connected to other field devices and equipment. The controller 12b, which may be by way of example only, the DeltaV™ controller sold by Fisher-Rosemont Systems, Inc., is capable of communicating with control elements, such as field devices and function blocks within field devices distributed throughout the process 16 to perform one or more process control routines to thereby implement desired control of the process 16. These process control routines may be continuous or batch process control routines or procedures. The workstations 13–15 (which may be, for example, personal computers or any other desired types of computers, servers, workstations, etc.) are located at different nodes of the process control system 10 and may be used by one or more engineers, operators, maintenance personnel, etc. to design process control routines to be executed by the controllers 12, to communicate with the controllers 12 so as to download such process control routines, to receive and display information pertaining to the process 16 during operation of the process 16 and to otherwise interact with the process control routines executed by the controllers 12. Each of the workstations 13–15 includes a memory 20 for storing applications, such as configuration design applications, and for storing data, such as configuration data pertaining to the configuration of the process 16. Each of the workstations 13–15 also includes a processor 21 that executes the applications to enable a user to design process control routines and to download these process control routines to the controllers 12a–12c. Likewise, the controller 12b is illustrated as including a memory 22 for storing configuration data and process control routines, such as phases for a batch process, to be used to control the process 16 and includes a processor 24 that executes the process control routines to implement a process control strategy. If the controller 12b is a DeltaV controller, it may provide a graphical depiction of the process control routines within the controller 12b to a user via one of the workstations 13–15 illustrating the control elements within the process control routine and the manner in which these control elements are configured to provide control of the process 16.

In the example process control network 10 illustrated in FIG. 1, the controller 12b is communicatively connected via the bus 18 to two sets of similarly configured equipment, each set having a reactor unit referred to herein as Reactor_01 (R1) or Reactor_02 (R2), a filter unit referred to herein as Filter_01 (F1) or Filter_02 (F2) and a dryer unit referred to herein as Dryer_01 (D1) or Dryer_02 (D2). Reactor_01 includes a reactor vessel 100, two input valves 101 and 102 connected so as to control fluid inlet lines providing fluid from, for example, a headtank (not shown) into the reactor vessel 100 and an output valve 103 connected so as to control fluid flow out of the reactor vessel 100 via an outlet fluid line. A device 105, which can be a sensor, such as a temperature sensor, a pressure sensor, a fluid level meter etc. or some other equipment such as an electrical heater or a steam heater, is disposed in or near the reactor vessel 100. The Reactor_01 is coupled via the valve 103 to the Filter_01 having filter equipment 110 which, in turn is coupled to the Dryer_01 having dryer equipment 120. Similarly, the second set of equipment includes the Reactor_02 which has a reactor vessel 200, two input valves 201 and 202, an output valve 203 and a device 205. The Reactor_02 is coupled to the Filter$_{13}$ 02 having filter equipment 210 which, in turn, is coupled to the Dryer$_{13}$ 02 which has dryer equipment 220. The filter equipment 110 and 210 and the dryer equipment 120 and 220 may have additional control elements (such as heaters, conveyor belts and the like), sensors, etc. associated therewith.

As illustrated in FIG. 1, the controller 12b is communicatively coupled to the valves 101–103, 201–203, to the devices 105, 205, to the filters 110, 210 and to the dryers 120 and 220 (and to the other equipment associated therewith) via the bus 18 to control the operation of these elements to perform one or more operations with respect to these units. Such operations may include, for example, filling the reactor vessels, or dryers, heating the material within the reactor vessels or dryers, dumping the reactor vessels or dryers, cleaning the reactor vessels or dryers, operating the filters, etc. Each of these different operations is performed by a different phase stored in and executed by, for example, the controller 12b.

The valves, sensors and other equipment illustrated in FIG. 1 may be any desired kind or type of equipment including, for example, Fieldbus devices, standard 4–20 ma devices, HART devices, etc. and may communicate with the controller 12b using any known or desired communication protocol such as the Fieldbus protocol, the HART protocol, the 4–20 ma analog protocol, etc. Still further, other types of devices may be connected to and be controlled by the controller 12b if so desired. Also, other controllers may be connected to the controller 12b and to the workstations 13–15 via the Ethernet communication link 17 to control other devices or areas associated with the process 16 and the operation of such additional controllers may be coordinated with the operation of the controller 12b illustrated in FIG. 1 in any desired manner.

Figure 2:
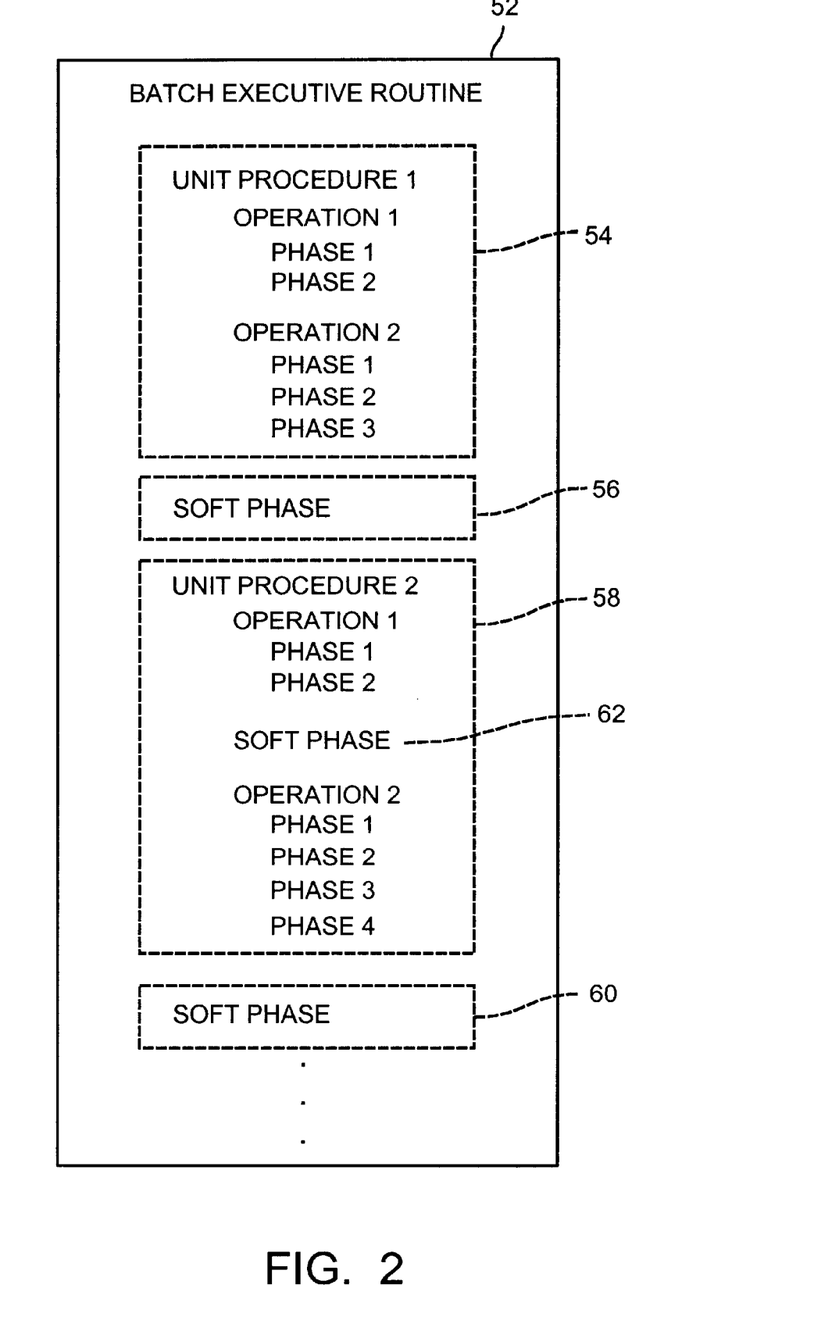
FIG. 2 is a diagram of a batch executive procedure that calls controller-based phases and soft phases.

Generally speaking, the process control system of FIG. 1 may be used to implement batch processes (or non-batch processes) in which, for example, the workstation 13 stores and executes an executive routine such as a batch executive routine. An example batch executive routine 52 is depicted in the workstation of FIG. 1 and is illustrated in more detail in FIG. 2. Generally speaking, the batch executive routine 52 is a high level control routine that directs the operation of one or more unit procedures, which are sub-routines or processes that operate on a single unit, such as one of the reactor units, the filter units, the dryer units, or other equipment of FIG. 1. Each unit procedure may include or perform a series of operations including one or more controller-based phases, traditionally simply called phases. For this discussion, a phase is the lowest level action or step performed on a unit and is usually implemented or executed in a controller (such as the controller 12b), an operation is a set of phases that performs a particular function on the unit and is typically implemented or executed on the workstation 13 by calling a series of phases run in a controller, while a unit procedure is a series of one or more operations performed on a single unit and is typically implemented as a set of operation calls. The batch executive 52 of FIG. 2 is illustrated as including four unit procedures 54, 56 and 58 and 60. The unit procedure 54 includes two operations having two or three phases each while the unit procedure 58 includes a soft phase 62 and two operations having two or four phases each. The unit procedures 56 and 60 are simply soft phases as described in more detail hereinafter. Of course, the batch executive routine 52 is exemplary and may include any other number of unit procedures, operations, phases and soft phases as portions thereof and, further, the soft phases may be within or separated from operations or unit procedures if so desired. Phases and soft phases can be called by the batch executive in any desired order or sequence and, in some case, can operate simultaneously. Also, the routine 52 can be any executive routine which calls subroutines or phases and is not limited to a batch executive routine.

As will be understood, the batch executive routine 52 performs different steps or stages needed to produce a product, such as a food product, a drug, etc. To implement different unit procedures, operations and phases, the batch procedure 52 uses what is commonly referred to as a recipe which specifies the steps to be performed, the amounts and times associated with the steps and the order of the steps. Steps for one recipe might include, for example, filling a reactor vessel with the appropriate materials or ingredients, mixing the materials within the reactor vessel, heating the materials within the reactor vessel to a certain temperature for a certain amount of time, emptying the reactor vessel and then cleaning the reactor vessel to prepare for the next batch run, running a filter to filter the output of a reactor and then running a dryer to dry the product created in the reactor vessel. Each of the series of steps associated with a different unit defines a unit procedure of the batch run and the batch executive routine or batch procedure 52 will cause execution of a different control algorithm for each one of these unit procedures. Of course, the specific materials, amounts of materials, heating temperatures and times, etc. may be different for different recipes and, consequently, these parameters may change from batch run to batch run depending on the product being manufactured or produced and the recipe being used. Those skilled in the art will understand that, while control routines and configurations are described herein for batch runs in the reactor units, the filter units and the dryer units illustrated in FIG. 1, control routines may be used to control other desired devices to perform any other desired batch process runs or to perform continuous process runs, if so desired.

As will also be understood by those skilled in the art, the same phases, operations or unit procedures of a batch process can be implemented on each of the different reactor units of FIG. 1 at the same or at different times. Furthermore, because the reactor units of FIG. 1 generally include the same number of and types of equipment (i.e., they belong to the same unit class), the same generic phase control routine for a particular phase may be used to control each of the different reactor units, except that this generic phase control routine is modified to control the different hardware or equipment associated with the different reactor units. For example, to implement a fill phase for Reactor_01 (wherein the reactor unit is filled), a fill control routine will open one or more of the input valves 101 or 102 for a certain amount of time, for example, until the fluid level meter 105 senses that the vessel 100 is full. However, this same control routine may be used to implement a fill phase for Reactor_02 by merely changing the designation of the input valve(s) to be the valves 201 or 202 instead of the valves 101 or 102 and by changing the designation of the fluid level meter to be the fluid level meter 205 instead of the fluid level meter 105. Likewise, a recipe may specify the level to which the tank is to be filled.

As noted above, in the past, soft phases, which are executed on a computer or workstation instead of a controller, had to be executed on the same computer or workstation as the batch executive routine 52. Thus, in the example system of FIG. 1, the soft phases 56, 60 and 62 had to be executed on the workstation 13 because that is the workstation in which the batch executive 52 is executed. However, the workstation 13 may be inconveniently located with respect to the actions that a user must take with respect to one or more of the soft phases 56, 60 and 62. In fact, it may be desirable to have the soft phases 56, 60 and 62 execute on one or more different workstations, such as the workstations 14 or 15 which might be closer to the equipment to which the soft phase pertains or which may be the workstation at which a person most suitable for interacting with the soft phase is located. Also, having the soft phases 56, 60 and 62 execute on one or more different workstations may reduce or help manage loading of the node which runs the batch executive routine or may help reduce communication traffic to and from the batch executive node.

The present invention enables the soft phases to be executed remotely from the node on which the batch executive routine is executed. Thus, for example, the present invention enables one or more of the soft phases 56, 60 and 62 to be stored and executed on the workstations 14 and 15 or any other workstation remote from (at a different node than) the workstation 13, which is the workstation on which the batch executive routine 52 is executed.

Figure 3:
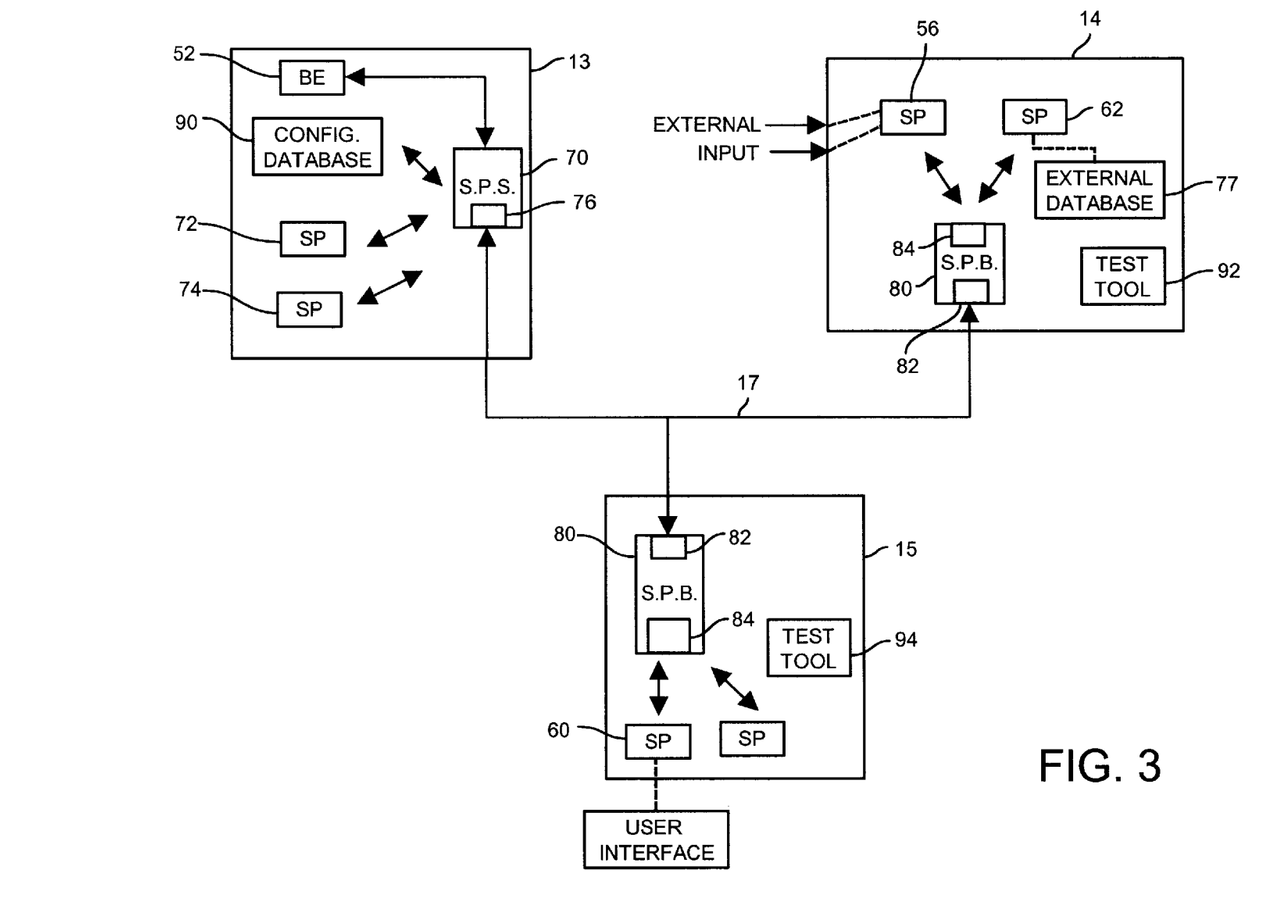
FIG. 3 is a block diagram illustrating three of the workstations in the process control system of FIG. 1 including the components enabling the batch executive to call soft phases located at remote nodes.

Referring now to FIG. 3, the workstations 13, 14 and 15 are shown in block diagram form and are communicatively interconnected by the bus 17. The workstations 13 stores and executes the batch executive routine 52 which runs the unit procedures 54 and 58 which, in turn, call phases stored in the controllers 12a–12c in any standard or known manner. Furthermore, the workstation 13 includes a soft phase server 70 that communicates with the batch executive routine 52. In the past, the soft phase server 70 was limited to locating and executing soft phases stored on the workstation 13, illustrated as soft phases 72 and 74. However, according to the invention, the soft phase server 70 is provided with remote communication software 76 that enables the soft phase server 70 to locate and cause execution of soft phases stored at other nodes, such as in the workstations 14 and 15. In particular, the soft phases 56 and 62 are stored on the workstation 14 while the soft phase 60 is stored on the workstation 15. The soft phase 56 may be involved with accepting external input such at that provided by barcode readers, etc. while the soft phase 62 may be involved with using an external database 77, such as a test or materials database. The soft phase 60 may be involved with communicating with an operator via a user interface to have the operator perform manual functions.

As illustrated in FIG. 3, each of the remote workstations 14 and 15 includes a soft phase broker 80 that is configured to communicate with the soft phase server 70 via the communication network or line 17. In particular, the soft phase brokers 80 include remote communication software 82 that communicates across the network 17 to the soft phase server 70. The communication software or layers 76 and 82 within the soft phase server 70 and the soft phase brokers 80 may be any type of communication software or communication layer associated with or used with the communication link 17, such as the Microsoft D-COM protocol, TCP, IP, etc. Furthermore, the soft phase brokers 80 include program launching software 84 that finds, initiates (launches) and communicates with the soft phases on the same node or computer. The soft phase brokers 80 coordinate the operation of the soft phases on the remote nodes in response to a call for the soft phase by the soft phase server 70. Also, the soft phase brokers 80 perform any necessary communication with the server 70 or the batch executive 52 on behalf of the soft phase being executed in the remote node. Thus, if a soft phase needs information or needs to inform the batch executive 52 of an error, etc., the soft phase broker 80 has communication software that passes these requests or messages to the soft phase server 70 over the link 17 and, if appropriate, receives responses from the batch executive 52. In effect, the soft phase broker 80 coordinates the operation of the soft phases on a node and each node that is to execute one or more soft phases includes a soft phase broker 80.

During operation of the batch executive 52, the batch executive 52 calls the soft phases 56, 62 and 60 at the appropriate times. To perform this function, the batch executive 52 stores an indication of the node or location at which the soft phases 56, 62 or 60 are stored and are to be executed. Alternatively, the identity of the node at which a soft phase is located may be stored in a configuration database 90 accessible to the soft phase server 70 or to the batch executive 52. Thus, when calling one of the soft phases, such as the soft phase 56, the batch executive 52 supplies the node location of the soft phase 56 to the soft phase server 70 along with other information that is needed by the soft phase 56 to execute. Alternatively, the soft phase server may find the location of the soft phase from the configuration database 90 or any other desired file or database. The soft phase server 70 then uses the remote communication software or layer 76 to establish communication with the soft phase broker 80 within the node or workstation 14 via the communication link 17. After or upon establishing communication with the soft phase broker 80 in the workstation 14, the soft phase server 70 instructs the soft phase broker 80 to find and execute the soft phase 56. Thereafter, the soft phase broker 80 looks within the workstation 14 to find the soft phase 56 and then launches the soft phase 56. During execution, the soft phase 56 interacts with the soft phase broker 80 to supply information to or to get information from the batch executive routine 52. Of course, during these communications, the soft phase broker 80 communicates with the soft phase server 70 which, in turn, communicates with the batch executive routine 52 when necessary. The soft phase 56 and/or the soft phase broker 80 and/or the soft phase server 70 reports errors or other problems that occur during operation of the soft phase 56 and the batch executive routine 52 either deals with the problem by providing further information to the soft phase 56, running a different routine, or reporting the problem to the operator.

After execution of the soft phase 56 is complete, the soft phase broker 80 informs the soft phase server 70 that execution has completed, the soft phase server 70 informs the batch executive routine 52 of the completion of the soft phase 56 and the batch executive 52 then calls the next procedure, operation or phase.

Of course, the soft phase server 70 can communicate with and cause execution of other soft phases within the same workstation 14 or within other workstations. Likewise, each soft phase broker can execute and communicate with any number of soft phases within a node or workstation. Also, any node or workstation can store and execute any number of soft phases, and a batch executive routine can execute or call any number of soft phases in any number of different nodes or workstations.

Generally speaking, the functionality of a standard or known soft phase server is divided into two portions with the first portion, the soft phase server 70 (which communicates with the batch executive routine 52) being stored in the same workstation or node as the batch executive routine 52 and the second portion, the soft phase broker 80 (which performs normal or standard communication with soft phases and which finds and executes soft phases) being stored in the same node as the soft phase. Each of these portions includes a communication routine or layer 76 or 82 that enables communication across a remote network link to the other to effect communications between the batch executive routine 52 and the soft phase. The particular types of communication that occur are standard in the use of known soft phases, except that the batch executive routine 52 or the soft phase server 70 must be informed of the node on which each particular soft phase is to be executed. This information can be provided by an operator before or during run time, or can be programmed in the batch executive routine itself, or can be stored in a configuration database 90 or any other database for file.

Still further, if desired, soft phase testing routines, illustrated in FIG. 3 as routines 92 and 94, which can take on any form or can be any type of desired testing program or procedure can be stored in the nodes on which the soft phases are stored. The testing routines 92 and 94 may be used to test and debug the soft phases at the nodes 14 and 15 without having to use the soft phase server 70 or the process control protocol associated with the executive routine 52. This, in turn, allows the soft phases to be tested and debugged separate and apart from operation of the process control system and at any desired time. In fact, the testing routines 92 and 94 can be used before the batch executive 52 or soft phase server 70 is provided to the system 10.

It will be understood that communication and phase routines, including the soft phase, the soft phase broker and the soft phase server routines described herein, can be used and implemented within any desired process control programming environment, and may be used in any process control system using any desired type of process control communication protocols and, further, may be used to perform any type of function with respect to any type of device(s) or sub-units of device(s). The routines as described herein are preferably implemented in software stored in, for example, a workstation, server or other computer device. However, these routines may alternatively or additionally be implemented in hardware, firmware, application specific integrated circuits, programmable logic circuits, etc., as desired. If implemented in software, the process control routines may be stored in any computer readable memory such as on a magnetic disk, a laser disk, or other storage medium, in a RAM or ROM of a computer, controller, field device, etc. Likewise, this software may be delivered to a user or a device via any known or desired delivery method including, for example, over a communication channel such as a telephone line, the Internet, on a transportable medium, such as a computer-readable disk, etc.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process control system for use in controlling a process having an executive routine stored in and executed at a first node within the process control system and having a second node, comprising:
   a soft phase server located in the first node and adapted to communicate with the executive routine;
   a soft phase stored in a second node remote from the first node, wherein the second node is communicatively coupled to the first node via a communication link; and
   a soft phase broker located at the second node and adapted to communicate with the soft phase server to cause execution of the soft phase at the second node.

2. The process control system of claim 1, wherein the soft phase server includes first communication software adapted to communicate with the soft phase broker via the communication link and wherein the soft phase broker includes second communication software adapted to communicate with the soft phase server via the communication link.

3. The process control system of claim 2, wherein the soft phase broker further includes a program launcher adapted to locate and execute the soft phase at the second node.

4. The process control system of claim 2, wherein the soft phase broker is adapted to inform the soft phase server when the soft phase has completed execution at the second node.

5. The process control system of claim 2, wherein the soft phase server is adapted to receive an indication of the location of the soft phase from the executive routine and to use the indication of the location of the soft phase to communicate with the soft phase broker at the second node.

6. The process control system of claim 2, wherein the soft phase server is adapted to retrieve an indication of the location of the soft phase from a configuration database and to use the indication of the location of the soft phase to communicate with the soft phase broker at the second node.

7. The process control system of claim 1, further including a soft phase test tool stored in and adapted to be executed on the second node to test the soft phase stored on the second node.

8. A process control system comprising:
   a first computing device located at a first node within the process control system;
   a second computing device located at a second node within the process control system;
   a communication link between the first and second nodes providing communications between the first and second nodes;
   an executive routine stored on and adapted to be executed by the first computing device;

a soft phase stored on an and adapted to be executed by the second computing device; and remote communication software stored on and adapted to be executed by the first and second computing devices to enable the executive routine to call the soft phase for execution via the communication link.

9. The process control system of claim 8, wherein the executive routine is a batch executive routine adapted to control a batch process.

10. The process control system of claim 8, wherein the remote communication software includes a server stored in and adapted to be executed on the first computing device and a broker stored in and adapted to be executed on the second computing device.

11. The process control system of claim 10, wherein the server includes first communication software adapted to communicate with the broker via the communication link and wherein the broker includes second communication software adapted to communicate with the server via the communication link.

12. The process control system of claim 11, wherein the broker further includes a program launcher adapted to locate and execute the soft phase on the second computing device.

13. The process control system of claim 12, wherein the broker is adapted to inform the server when the soft phase has completed execution.

14. The process control system of claim 12, wherein the executive routine is adapted to inform the server of the location of the soft phase.

15. The process control system of claim 12, further including a configuration database that stores the location of the soft phase for use by the soft phase server.

16. The process control system of claim 8, further including a soft phase test tool stored in and adapted to be executed on the second computing device to test the soft phase stored on the second computing device.

17. A method of performing a control routine within a process, comprising the steps of:

storing an executive routine within a first computing device;

storing a soft phase in a second computing device remotely located from the first computing device but connected to the first computing device via a communication link;

using the executive routine to call a series of phases to be performed in the process, wherein at least one of the phases is the soft phase; and using a server in the first communication device to communicate with the executive routine in the first computing device and to communicate with the second computing device via the communication link to cause execution of the soft phase within the second computing device when the executive routine calls the soft phase.

18. The method of claim 17, wherein the step of storing the executive routine includes the step of storing a batch executive routine adapted to control a batch process.

19. The method of claim 17, further including the step of using a broker routine within the second computing device to communicate with the server via the communication link and to launch the soft phase in the second computing device.

20. The method of claim 17, further including the step of using a communication layer in the server and the broker routine to communicate via the communication link.

21. The method of claim 20, further including the step of using the broker routine to inform the server when the soft phase has completed execution on the second computing device.

22. The method of claim 17, further including the step of passing an indication of the location of the soft phase to the server when the executive routine calls the soft phase.

23. The method of claim 17, further including the step of storing an indication of the location of the soft phase in a database and using the indication of the location of the soft phase to communicate with the soft phase broker at the second node.

24. The method of claim 17, further including the steps of storing and using a soft phase test tool at the second computing device to test the soft phase stored on the second computing device.

25. The method of claim 17, wherein the step of using the server to communicate includes the step of using the D-COM protocol.

* * * * *

UNITED STATES PATENT AND TRADEMARK OFFICE
CERTIFICATE OF CORRECTION

PATENT NO. : 6,647,315 B1
DATED : November 11, 2003
INVENTOR(S) : Sherriff et al.

It is certified that error appears in the above-identified patent and that said Letters Patent is hereby corrected as shown below:

Column 5,
Line 29, please delete "$Filter_{13}02$" and replace with -- $Filter\_02$ --.
Line 30, please delete "$Dryer_{13}02$" and replace with -- $Dryer\_02$ --.

Column 11,
Line 1, please delete "stored on an and" and replace with -- stored on and --.

Signed and Sealed this

Twentieth Day of July, 2004

JON W. DUDAS
*Acting Director of the United States Patent and Trademark Office*